United States Patent
Saito et al.

(10) Patent No.: US 7,185,240 B2
(45) Date of Patent: Feb. 27, 2007

(54) APPARATUS AND METHOD FOR TESTING CODEC SOFTWARE BY UTILIZING PARALLEL PROCESSES

(75) Inventors: Kenji Saito, Kawasaki (JP); Kazuyoshi Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 11/157,803

(22) Filed: Jun. 22, 2005

(65) Prior Publication Data
US 2006/0212769 A1 Sep. 21, 2006

(30) Foreign Application Priority Data
Mar. 8, 2005 (JP) .............................. 2005-064356

(51) Int. Cl.
G11B 20/20 (2006.01)
G10L 19/02 (2006.01)
(52) U.S. Cl. ..................................... 714/700; 704/203
(58) Field of Classification Search ..................... None
See application file for complete search history.

(56) References Cited

U.S. PATENT DOCUMENTS 5,889,549 A * 3/1999 Yasuda et al. ........... 348/14.01
6,011,824 A * 1/2000 Oikawa et al. ............. 375/377
6,985,589 B2 * 1/2006 Morley et al. .............. 380/269

FOREIGN PATENT DOCUMENTS

JP 2001-242894 9/2001

* cited by examiner

Primary Examiner—Christine T. Tu
(74) Attorney, Agent, or Firm—Staas & Halsey LLP

(57) ABSTRACT

An apparatus for testing codec software includes a processor unit operative to execute a test program to read input data from a memory unit, to transform the input data according to transformation conditions by referring to data of the transformation conditions stored in the memory unit, and to generate a plurality of transformed data sets for storage in the memory unit, operative to execute a codec program to perform a plurality of encoding processes in parallel with respect to the plurality of transformed data sets stored in the memory unit to generate a plurality of encoded data sets, and to perform a plurality of decoding processes in parallel with respect to the plurality of encoded data sets to generate a plurality of decoded data sets, and operative to execute the test program to evaluate quality of at least one of the encoded data sets and the decoded data sets.

12 Claims, 6 Drawing Sheets

FIG.5B

SET ENCODE MODE

| P1 | P2 | P3 | P4 | P5 | P6 | P7 | P8 |

49

|   | Mode | Bitrate[bps] | gain |
|---|------|--------------|------|
| 1 ☑ | STEREO ▶ | 64000 ▶ | 1.0 ▶ |

P1 ALL

| 2 ☐ | STEREO ▶ | 128000 ▶ | 1.0 ▶ |
| 3 ☐ | STEREO ▶ | 256000 ▶ | 1.0 ▶ |
| 4 ☐ | BILINGUAL ▶ | 64000 ▶ | 1.0 ▶ |
| 5 ☐ | BILINGUAL ▶ | 128000 ▶ | 1.0 ▶ |
| 6 ☐ | BILINGUAL ▶ | 256000 ▶ | 1.0 ▶ |
| 7 ☐ | STEREO ▶ | 64000 ▶ | 1.125 ▶ |
| 8 ☐ | STEREO ▶ | 128000 ▶ | 1.125 ▶ |
| 9 ☐ | STEREO ▶ | 256000 ▶ | 1.125 ▶ |
| 10 ☐ | BILINGUAL ▶ | 64000 ▶ | 1.125 ▶ |
| 11 ☐ | BILINGUAL ▶ | 128000 ▶ | 1.125 ▶ |
| 12 ☐ | BILINGUAL ▶ | 256000 ▶ | 1.125 ▶ |

48

OK   CANCEL

CHANGE OF SPECIFIED PATTERN (DETAILED SETTING)

APPARATUS AND METHOD FOR TESTING CODEC SOFTWARE BY UTILIZING PARALLEL PROCESSES

CROSS-REFERENCE TO RELATED APPLICATIONS

The present application is based upon and claims the benefit of priority from the prior Japanese Patent Application No. 2005-064356 filed on Mar. 8, 2005, with the Japanese Patent Office, the entire contents of which are incorporated herein by reference.

BACKGROUND OF THE INVENTION

1. Field of the Invention

The present invention generally relates to information processing apparatuses and information processing methods, and particularly relates to a codec software testing apparatus and codec software testing method for testing the quality of codec software.

2. Description of the Related Art

Since image or audio information tends to become a large volume when recorded as digital data, data compressed by an encoder may be recorded at the time of recording, and a decoder may be used to decompress the compressed data at the time of reproduction. An encoder/decoder (codec) may be implemented as LSI-based hardware, but may often be provided as software for use in a typical computer environment.

When codec software is designed and developed, it is necessary to conduct testing from various perspectives so as to check whether the developed codec software can perform data compression/decompression with proper quality. Compression/decompression involves a large amount of complex computing. Even if a desired output is obtained with respect to simple data, the inputting of complex data may result in a problem arising in terms of the quality of data obtained through compression/decompression. Accordingly, if the codec is designed for video and audio, for example, it is necessary to test its compression/decompression process by use of data obtained by recording images and sounds of the real world.

It may be the case that the compression/decompression process is properly performed for a short duration of time with respect to the complex image and sound data of the real world. If the processing of data is continued for a long duration, however, it may be found that there are some instances at which the quality of the compression/decompression is not acceptable even though such occurrence is infrequent. There is thus a need to test the operation of a codec by use of images and sounds of the real world for a sufficiently long duration of time.

When such images and/or sounds are recorded, a 12-hour recording time is necessary in order to record the data equal in amount to 12 hours. When the data recorded in this manner is entered into a codec for testing on a real-time basis, a 12-hour testing time is required in order to conduct testing for the data equal in amount to 12 hours.

Japanese Patent Application Publication No. 2001-242894 discloses a technology for audio signal processing that performs effective parallel processing of two processes that have processing volumes quite different from each other.

Accordingly, there is a need for a codec software testing apparatus and codec software testing method that can effectively perform testing of a codec software operation.

SUMMARY OF THE INVENTION

It is a general object of the present invention to provide a codec software testing apparatus and codec software testing method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a codec software testing apparatus and codec software testing method particularly pointed out in the specification in such full, clear, concise, and exact terms as to enable a person having ordinary skill in the art to practice the invention.

To achieve these and other advantages in accordance with the purpose of the invention, the invention provides an apparatus for testing codec software, which includes a memory unit operative to store a codec program, a test program, input data, and data of transformation conditions, and a processor unit configured to execute the codec program and the test program. The processor unit is operative, by executing the test program, to read the input data from the memory unit, to transform the input data according to the transformation conditions by referring to the data of the transformation conditions stored in the memory unit, and to generate a plurality of transformed data sets for storage in the memory unit. The processor unit is further operative, by executing the codec program, to perform a plurality of encoding processes in parallel with respect to the plurality of transformed data sets stored in the memory unit to generate a plurality of encoded data sets, and to perform a plurality of decoding processes in parallel with respect to the plurality of encoded data sets to generate a plurality of decoded data sets. The processor unit is further operative, by executing the test program, to evaluate quality of at least one of the plurality of encoded data sets and the plurality of decoded data sets.

According to another aspect of the present invention, a method of testing codec software includes executing a test program by a processor unit to read input data from a memory unit, to transform the input data according to transformation conditions by referring to data of the transformation conditions stored in the memory unit, and to generate a plurality of transformed data sets for storage in the memory unit, executing a codec program by the processor unit to perform a plurality of encoding processes in parallel with respect to the plurality of transformed data sets stored in the memory unit to generate a plurality of encoded data sets, and to perform a plurality of decoding processes in parallel with respect to the plurality of encoded data sets to generate a plurality of decoded data sets, and executing the test program by the processor unit to evaluate quality of at least one of the plurality of encoded data sets and the plurality of decoded data sets.

According to at least one embodiment of the present invention, compression/decompression processes are performed in parallel for quality test purposes with respect to a plurality of digital data sets. If 10 digital data sets each for 12 hours are generated based on the original data for 12 hours, and 10 compression/decompression processes are performed in parallel, a test on the scale equal to 120 hours can be conducted in 12 hours. In the related art, only one test is conducted for one original data item whereas the present invention performs a plurality of tests in parallel with respect to one original data item. The present invention can thus reduce the length of a testing time proportionately to the scale of parallelism.

BRIEF DESCRIPTION OF THE DRAWINGS

Other objects and further features of the present invention will be apparent from the following detailed description when read in conjunction with the accompanying drawings, in which:

FIGS. 5A and 5B are illustrative drawings showing the user interfaces of the codec software testing apparatus according to the present invention.

DESCRIPTION OF THE PREFERRED EMBODIMENTS

In the present invention, a camera and/or microphone or the like is used to obtain information such as images and/or sounds from the real world (i.e., rather than information synthesized in a computer) as analog signals, and the obtained analog signals are converted into digital data for storage in memory. The digital data stored in the memory is then used as a basis to generate a plurality of data sets according predetermined settings and/or by use of random numbers. That is, the digital data that represents the original images and/or sounds are transformed under different conditions to generate a plurality of digital data sets each representing images and/or sounds.

The plurality of digital data sets generated in this manner are then entered into codec software to be tested, so that data compression/decompression is performed in parallel with respect to the plurality of digital data sets. The output of data compression and/or the output of data decompression are then checked by use of software means with respect to each of the compression/decompression processes that are performed in parallel as described above. In this manner, a check is made as to whether the data compression/decompression by the codec software are properly performed with desired quality.

According to the present invention as described above, compression/decompression processes are performed in parallel for quality test purposes with respect to a plurality of digital data sets. If 10 digital data sets each for 12 hours are generated based on the original data for 12 hours, and 10 compression/decompression processes are performed in parallel, a test on the scale equal to 120 hours can be conducted in 12 hours. In the related art, only one test is conducted for one original data item whereas the present invention performs a plurality of tests in parallel with respect to one original data item. The present invention can thus reduce the length of a testing time proportionately to the scale of parallelism.

In the following, embodiments of the present invention will be described with reference to the accompanying drawings.

Figure 1:
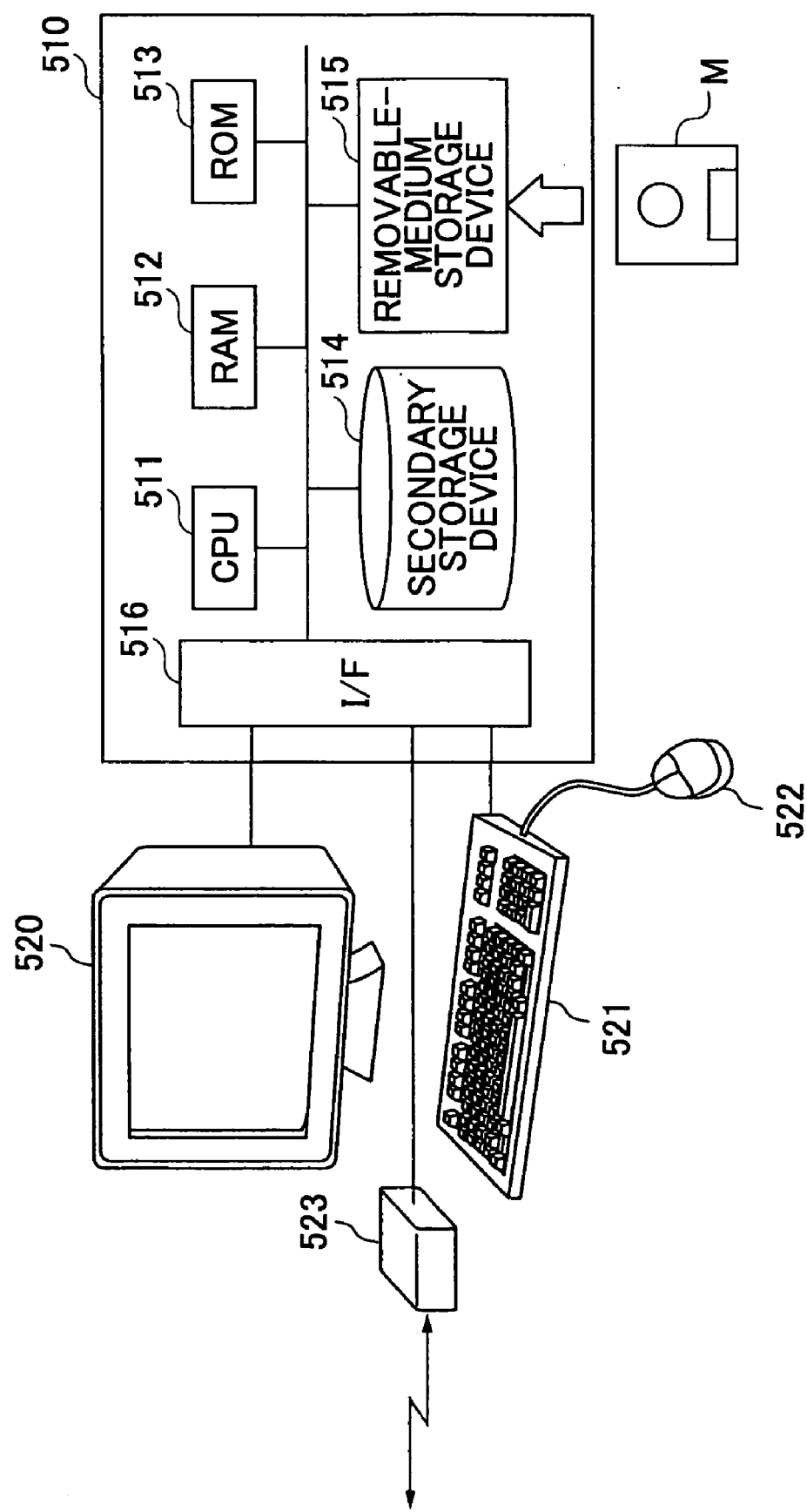
FIG. 1 is a drawing showing the configuration of an apparatus for performing a codec software testing method according to the present invention.

FIG. 1 is a drawing showing the configuration of an apparatus for performing a codec software testing method according to the present invention.

As shown in FIG. 1, the apparatus for performing a codec software testing method according to the present invention is implemented by use of a computer such as a personal computer or an engineering workstation. The apparatus of FIG. 1 includes a computer 510, a display apparatus 520 connected to the computer 510, a communication apparatus 523, and an input apparatus. The input apparatus includes a keyboard 521 and a mouse 522. The computer 510 includes a CPU 511, a ROM 513, a secondary storage device 514 such as a hard disk, a removable-medium storage device 515, and an interface 516.

The keyboard 521 and mouse 522 provide user interface, and receive various commands for operating the computer 510 and user responses responding to data requests or the like. The display apparatus 520 displays the results of the processing by the computer 510, and further displays various data that makes it possible for the user to communicate with the computer 510. The communication apparatus 523 serves to communicate with a remote site, and may be comprised of a modem, a network interface, or the like.

The codec software testing method according to the present invention is provided as a computer program executable by the computer 510. This computer program is stored in a memory medium M that is mountable to the removable-medium storage device 515. The computer program is loaded to the RAM 512 or the secondary storage device 514 from the memory medium M through the removable-medium storage device 515. Alternatively, the computer program may be stored in a remote memory medium (not shown), and is loaded to the RAM 512 or the secondary storage device 514 from the remote memory medium through the communication apparatus 523 and the interface 516.

Upon user instruction for program execution entered through the keyboard 521 and/or the mouse 522, the CPU 511 loads the program to the RAM 512 from the memory medium M, from the remote memory medium, or from the secondary storage device 514. The CPU 511 executes the program loaded to the RAM 512 by use of an available space of the RAM 512 as a work area, and continues processing while communicating with the user as such a need arises. The ROM 513 stores therein control programs for the purpose of controlling the basic operations of the computer 510.

The computer program described above is executed to perform the codec software testing method according to the present invention. Further, this computing environment is a codec software testing apparatus according to the present invention.

Figure 2:
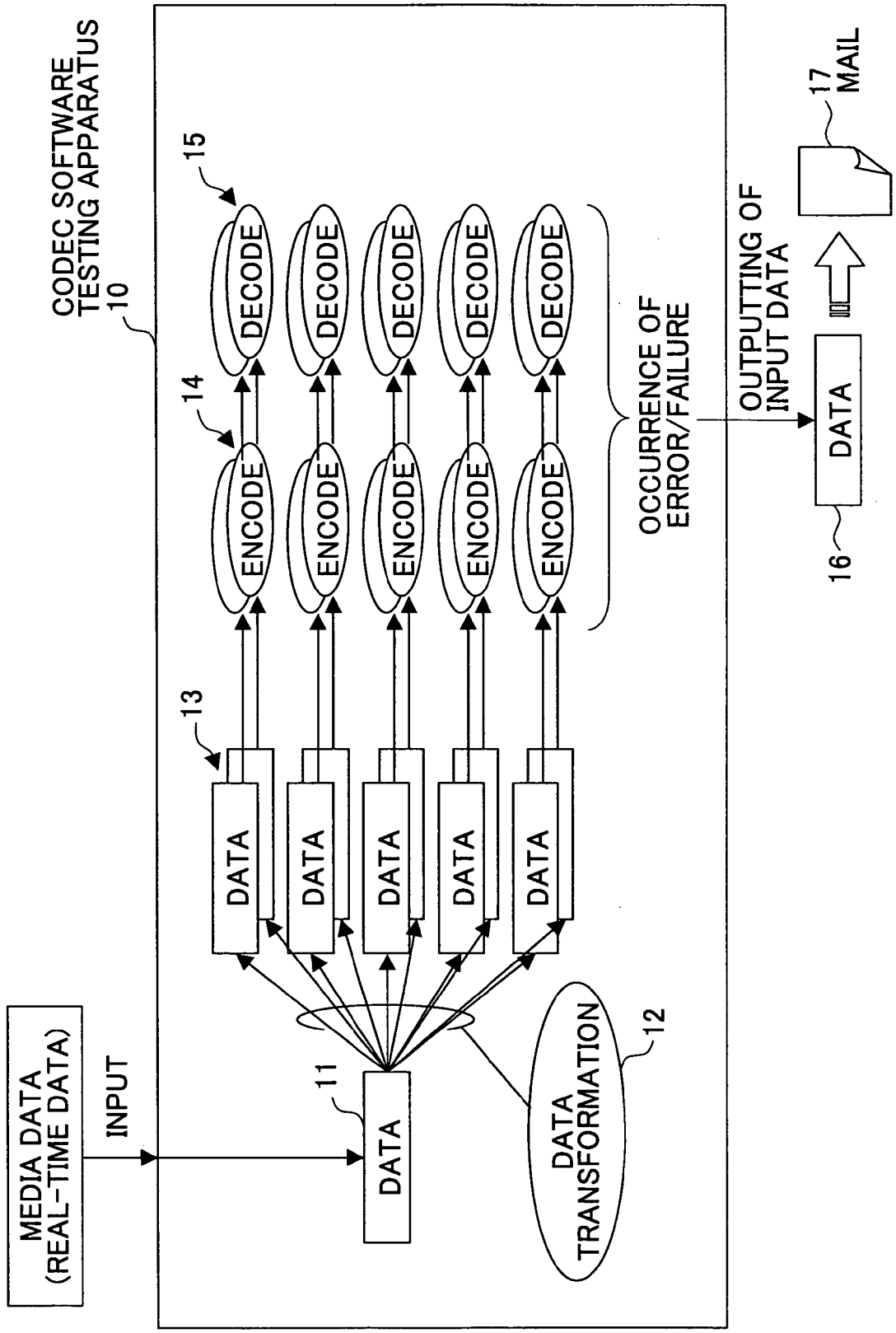
FIG. 2 is a drawing for explaining the operation of the codec software testing apparatus according to the present invention.

FIG. 2 is a drawing for explaining the operation of the codec software testing apparatus according to the present invention. In a codec software testing apparatus 10 shown in FIG. 2, media data supplied from an exterior as real-time data is stored in a buffer (the RAM 512 of FIG. 1) as digital data 11. The digital data 11 stored in the buffer is transformed under various different conditions by a data transforming process 12 performed by the CPU 511 of FIG. 1. A plurality of digital data sets 13 generated in this manner are then stored in the buffer (the RAM 512 of FIG. 1).

The plurality of digital data sets 13 stored in the buffer are compressed by a plurality of encoding processes (compression processes) 14 performed by the CPU 511, followed by being decoded by a plurality of decoding processes (decompression processes) 15 performed by the CPU 511. The plurality of encoding processes 14 and the plurality of decoding processes 15 are may be implemented as parallel "processes" executed on an OS that is designed to perform multi-tasks, for example.

If a single CPU 511 performs the plurality of encoding processes 14 and the plurality of decoding processes 15, n processes performed in parallel do not mean that the computing capacity of the CPU 511 becomes n times greater. If the compression/decompression processes by the CPU 511 are performed on a real-time basis according to the speed at which the data is supplied from the exterior, or are performed on a real-time basis according to the speed at which the images and/or sounds are reproduced, the computing capacity of the CPU 511 may have a sufficient slack that can be further utilized. If it is possible to perform n parallel processes within such slack, the execution of the n parallel processes allows a test to be conducted with respect to n times as much data without requiring a longer testing time.

The CPU 511 may be configured to execute a plurality of processes by use of multi-threads. The CPU 511 is not limited to a single processor configuration, and may be configured such that a plurality of processors performs parallel processing.

The CPU 511 performs the plurality of encoding processes 14 and the plurality of decoding processes 15, and further performs a software process for checking the quality of the output data of these processes. If the process outputs have a quality problem, i.e., if the process outputs contain an error or failure, the data that has caused the error or failure is output. Data 16 that is output in this manner may be displayed on a display apparatus (the display apparatus 520 shown in FIG. 1), for example, and/or may be output on paper sheets as printouts. Further, a notice indicative of the occurrence of the error or failure may be sent to a predetermined user by use of electronic mail 17. The electronic mail 17 may be sent with an attachment, which may be the input data having caused the error or failure, or may be information for identifying such input data.

Regarding the plurality of encoding processes 14 and the plurality of decoding processes 15, information about internal parameters of the codec software may be presented on the display apparatus and/or stored in the memory at proper timing as such need arises. The provision of the information about internal parameters for use by the user allows debugging to be efficiently performed with respect to the codec software.

Figure 3:
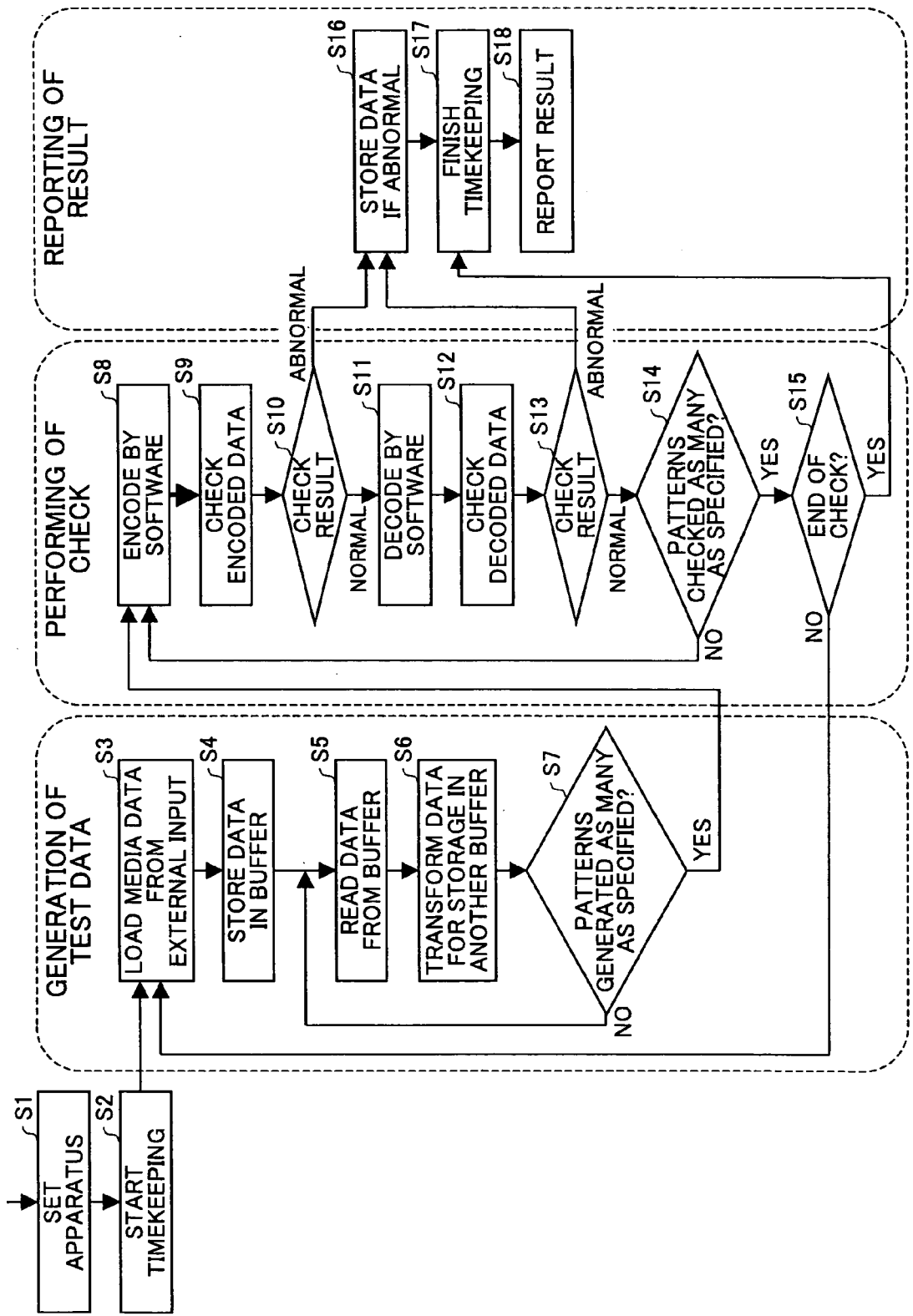
FIG. 3 is a flowchart showing an example of a procedure for the codec software testing method according to the present invention.

FIG. 3 is a flowchart showing an example of a procedure for the codec software testing method according to the present invention. At step S1, conditions are set for the codec software testing apparatus 10. This performs setting of conditions of the data transformation by the data transforming process 12, conditions of the notification of test results, etc. The setting of conditions is performed by use of a graphical interface or the like of the codec software testing apparatus 10, which will be described later. Data indicative of the set conditions are then stored in the RAM 512 (FIG. 1).

At step S2, timekeeping starts. This serves to measure the testing time so as to leave a record indicative of how many hours' worth of testing was actually conducted. At step S3, media data (images and/or sounds, etc.) are loaded into the codec software testing apparatus 10 through its external input terminal. The codec software testing apparatus 10 may have an A/D converter provided therein, or may load the data after it is externally A/D-converted.

At step S4, the loaded data is stored in the buffer. At step S5, the data is read from the buffer. At step S6, the data is modified and stored in another buffer. Namely, the digital data 11 (FIG. 2) is read from the RAM 512 (or a dedicated memory such as a frame memory provided for the external input of the codec software testing apparatus 10), and is then transformed by the data transforming process 12 performed by the CPU 511 (FIG. 1), followed by storing the transformed digital data set 13 in another area of the RAM 512. In so doing, the data transforming process 12 is performed in accordance with the specified conditions of transformation by referring to the conditions of transformation stored in the RAM 512.

At step S7, a check is made as to whether patterns already generated are as many as the number specified. Here, the number specified is one of the conditions of the data transforming process 12 that are set at step S1, and indicates how many digital data sets 13 in total need to be generated. If the patterns generated so far is not as many as the number specified (NO at step S7), the procedure goes back to step S5 to repeat the data transforming process 12. If the patterns generated are as many as the number specified (YES at step S7), the procedure goes to step S8.

At step S8, an encoding process by way of software is performed. Namely, the CPU 511 performs the plurality of encoding processes 14 separately for the respective digital data sets 13 stored in the RAM 512. As a result, encoded data sets are generated in one-to-one correspondence with the digital data sets 13.

At step S9, the encoded data is checked. This is performed as a software process executed by the CPU 511, and serves to check whether the encoded data has a predetermined data structure for encoded outputs, for example. At step S10, a check is made as to whether the check results are proper without any anomaly. If they are proper, the procedure goes to step S11. If the check results are not proper, the procedure goes to step S16.

At step S11, a software-based decoding process is performed. Namely, the CPU 511 performs the plurality of decoding processes 15 separately for the respective encoded data sets that are output from the plurality of encoding processes 14. As a result, a plurality of decoded data sets are generated in one-to-one correspondence with the plurality of encoded data sets.

At step s12, the decoded data are checked. This is performed as a software process executed by the CPU 511, and serves to check whether the decoded data has a predetermined data structure for decoded outputs, and also to compare the decoded data with the digital data sets 13 serving as the inputs into the encoding process, thereby evaluating how much these two data sets are different from each other, for example. As an evaluation standard, a predetermined S/N ratio may be specified in advance. Anomaly is then detected if the data after compression and decompression has an S/N ratio smaller than the predetermined S/N ratio.

If the input data is voice data, for example, PSQM (Perceptual Speech Quality Measurement) may be used. In Perceptual Speech Quality Measurement, recoded speech is input into a tested system such as a speech codec as a reference signal. A degraded signal output from the tested system is compared as a test signal with the reference signal, thereby performing subjective speech quality evaluation. In such Perceptual Speech Quality Measurement, factors affecting speech quality are quantified by use of numerical values with respect to a model of speech perception, and the subjective evaluation can be obtained based on these objective numerical values.

At step S13, a check is made as to whether the check results are proper without any anomaly. If they are proper, the procedure goes to step S14. If the check results are not proper, the procedure goes to step S16.

At step S14, a check is made as to whether the patterns checked so far are as many as the number specified. Although the plurality of encoding processes 14 and the plurality of decoding processes 15 are performed in parallel with respect to the plurality of digital data sets 13, all the processes do not come to an end at the same time. If the patterns checked so far are not as many as the number specified (NO at step S14), the procedure of step S8 onwards will be repeated until the check is completed with respect to all the remaining compression/decompression processes. If the patterns checked so far are as many as the number specified (YES at step S14), the procedure goes to step S15.

At step S15, a check is made as to whether all the checks are completed. For example, the plurality of digital data sets 13 generated by applying transformation that is not so extreme may be used as a first set for testing. If no anomaly is found in the test results, the extent of transformation is increased to generate another plurality of digital data sets 13, which is then used as a new set for testing. Alternatively, a test may be conducted with respect to the plurality of digital data sets 13 by spending a predetermined testing time. If the checks of the test results find no anomaly, the testing time may then be set longer to conduct a further testing. If all the checks are not completed (NO at step S15), the procedure goes back to step S3 to repeat the procedure of step S3 onwards. If all the checks are completed (YES at step S15), the procedure goes tack to step S17.

If anomaly is found in the check results at step S10 or S13, the abnormal data is stored at step S16. Namely, the data obtained as an encoded output and found as being abnormal and/or the data obtained as a decoded output and found as being abnormal are stored in the RAM 512.

At step S16, the timekeeping started at step S2 is brought to an end. At step S18, test results are reported. This is done by presenting on the display apparatus an indication showing the normal/abnormal status of the test results, and/or by transmitting to a user at a predetermined mail address a mail message indicative of the normal/abnormal status of the test results, for example. According to need, the abnormal data may be presented on the display apparatus, and/or the digital data set 13 having caused the anomaly may be presented on the display apparatus.

Figure 4:
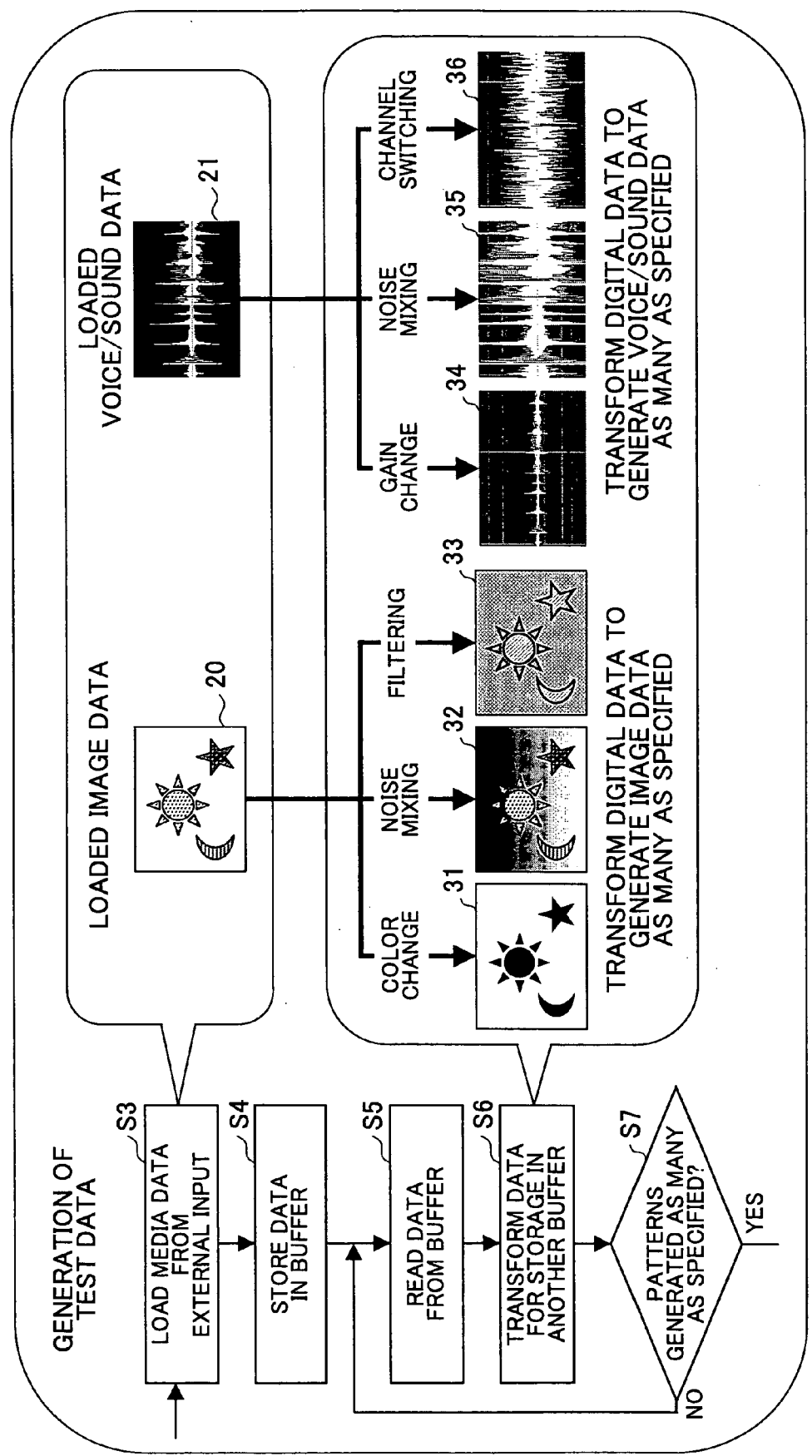
FIG. 4 is a drawing for explaining the detail of a data transforming process.

FIG. 4 is a drawing for explaining the detail of the data transforming process 12. Steps S3 through S7 shown on the left-hand side of FIG. 4 are the same as steps S3 through S7 shown in FIG. 3. FIG. 4 illustrates an example in which the media data is comprised of image data and voice/sound data.

The media data loaded at step S3 includes image data 20 and voice/sound data 21. The image data 20 and the voice/sound data 21 are transformed at step S6, thereby to generate various data sets.

With respect to the image data 20, colors may be changed, for example, to generate color changed data 31, or noise may be mixed to generate noise mixed data 32. Alternatively, a filtering process may be applied to generate filtered data 33. In so doing, the conditions of color changes, the conditions of noise mixing, the conditions of filtering, etc., may be changed to apply digital processing under various different conditions to transform the image data 20. As a result, image data sets as many as the number specified are generated for provision to compression/decompression processes that are executed in parallel.

The color change process may add an offset to the R component among the RGB components of the image, thereby generating image data with an increased red tint over the entire image, or may change the balance of RGB randomly, thereby generating image data with randomly changed hue. As a noise to be mixed, the white Gaussian noise or the like may be used. As a filtering process, edge enhancement, blurring, special-effect process such as embossing, etc., may be applied.

With respect to the voice/sound data 21, the gain may be changed, for example, to generate gain-changed data 34, or noise is mixed to generate noise-mixed data 35. Alternatively, the channels are switched to generate channel-switched data 36. In so doing, the conditions of gain changes, the conditions of noise mixing, the conditions of channel switching, etc., may be changed to apply digital processing under various different conditions to transform the voice/sound data 21. As a result, voice/sound data sets as many as the number specified are generated for provision to compression/decompression processes that are executed in parallel.

The gain change process may increase/decrease the sound volume by a predetermined gain change, or may increase/decrease the sound volume randomly along the passage of time. As a noise to be mixed, the white Gaussian noise or the like may be used. As channel switching, the left and right channels of the stereo sounds may be randomly switched with each other along the passage of time.

Figure 5A:
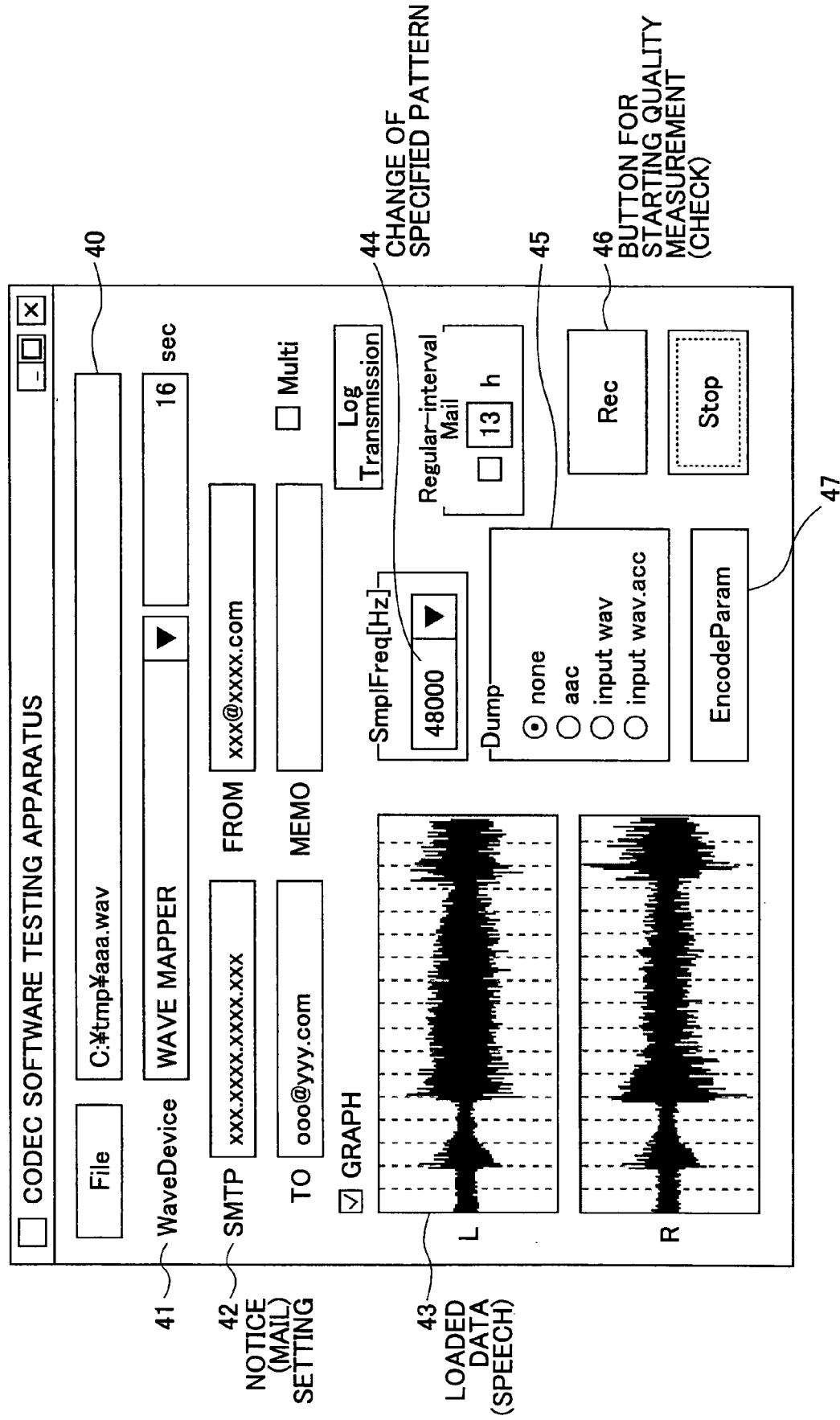

FIGS. 5A and 5B are illustrative drawings showing the user interfaces of the codec software testing apparatus 10 according to the present invention. The codec software testing apparatus 10 presents on the display apparatus 520 (FIG. 1) the windows as shown in FIGS. 5A and 5B as a graphical user interface, thereby allowing user settings to be entered with respect to the conditions of the data transforming process 12 and other testing conditions. This corresponds to the process of step S1 shown in the flowchart of FIG. 3.

FIGS. 5A and 5B illustrate an example in which a speech codec is applied to speech data. FIG. 5A shows a window for specifying general conditions regarding the testing of a speech codec. A field 40 indicates that speech data to be tested is "aaa.wav". A field 41 specifies "WAVE MAPPER" as a WAVE device. As a result, a priority device selected by the user on the computer system is to be used as a speech codec.

A field 42 is used to perform setting with respect to a notice of test results by mail. In this example, setting is performed such that the test results are reported to "ooo@yyy.com". A field 43 shows a waveform of original speech data that is to be tested. A field 44 is used to change the sample frequency of the specified pattern. In this example, 48000 Hz is specified as a sample frequency.

A field 45 is used to select a data format of data that is output at the time of anomaly. Such selection may indicate the dumping of data having the data format conforming to aac (Advanced Audio Coding) which is a speech compression system used in the video compression standard MPEG-2 or MPEG-4, the dumping of data having the wav format which is one of the sound file formats used in Windows, or the dumping of data in both the wav format and the aac format. In this example, no dumping (none) is selected.

A button 46 serves to start the testing of a specified speech codec by use of specified speech data. A click on this button initiates the testing of speech codec operation. A button 47 is used to specify the conditions of transformation of speech data that is subjected to encoding. A click on this button results in the window of FIG. 5B being displayed, thereby allowing settings to be specified with respect to the details of data transformation.

On the window shown in FIG. 5B, settings may be specified with respect to a combination of three parameters, i.e., a speech mode indicative of either stereo or dual sound, a bit rate, and a gain. If a combination 48 indicated as number 8 in FIG. 5B is selected, data with the stereo mode, the bit rate being 128000, and the gain being 1.125 is generated as data to be tested. If more than one combination is selected, more than one test date item is generated.

Tabs 49 shown at the top of the window of FIG. 5B may be selected, thereby allowing detailed settings to be performed with respect to other parameters in addition to P1 currently illustrated in FIG. 5B. For example, settings may be specified with respect to a parameter for indicating a noise level, a parameter for specifying the switching of right and left channels.

Further, the present invention is not limited to these embodiments, but various variations and modifications may be made without departing from the scope of the present invention.

In the embodiments described above, a description was given of the configuration in which a camera and/or microphone or the like is used to obtain information such as images and/or sounds from the real world as analog signals, and the obtained analog signals are converted into digital data, thereby generating original digital data such as images and/or sounds. As original digital data, however, digital data randomly generated by use of a computer may also be utilized for testing in addition to the signals obtained from the real world.

What is claimed is:

1. An apparatus for testing codec software, comprising:
 a memory unit operative to store a codec program, a test program, input data, and data of transformation conditions; and
 a processor unit configured to execute the codec program and the test program,
 said processor unit being operative, by executing the test program, to read the input data from said memory unit, to transform the input data according to the transformation conditions by referring to the data of the transformation conditions stored in said memory unit, and to generate a plurality of transformed data sets for storage in said memory unit,
 said processor unit being operative, by executing the codec program, to perform a plurality of encoding processes in parallel with respect to the plurality of transformed data sets stored in said memory unit to generate a plurality of encoded data sets, and to perform a plurality of decoding processes in parallel with respect to the plurality of encoded data sets to generate a plurality of decoded data sets, and
 said processor unit being operative, by executing the test program, to evaluate quality of at least one of the plurality of encoded data sets and the plurality of decoded data sets.

2. The apparatus as claimed in claim 1, wherein said input data includes at least one of image data and speech data.

3. The apparatus as claimed in claim 2, wherein said processor unit executes the test program to store said at least one of image data and speech data in said memory unit as the input data on a real-time basis as said at least one of image data and speech data is supplied from an exterior of the apparatus.

4. The apparatus as claimed in claim 1, wherein the plurality of encoding processes are performed in parallel as a plurality of multi-process-OS processes, and the plurality of decoding processes are performed in parallel as a plurality of multi-process-OS processes.

5. The apparatus as claimed in claim 1, further comprising a display device, wherein said processor unit executes the test program to display results of the quality evaluation on said display device.

6. The apparatus as claimed in claim 1, further comprising a display device, wherein said processor unit executes the test program to display a screen for allowing the data of the transformation conditions to be entered, and to store in said memory unit the data of the transformation conditions entered through the screen.

7. The apparatus as claimed in claim 1, wherein said processor unit executes the test program to generate data randomly inside the apparatus and to store the randomly generated data in said memory unit as the input data.

8. A method of testing codec software, comprising:
 executing a test program by a processor unit to read input data from a memory unit, to transform the input data according to transformation conditions by referring to data of the transformation conditions stored in the memory unit, and to generate a plurality of transformed data sets for storage in the memory unit;
 executing a codec program by the processor unit to perform a plurality of encoding processes in parallel with respect to the plurality of transformed data sets stored in the memory unit to generate a plurality of encoded data sets, and to perform a plurality of decoding processes in parallel with respect to the plurality of encoded data sets to generate a plurality of decoded data sets; and
 executing the test program by the processor unit to evaluate quality of at least one of the plurality of encoded data sets and the plurality of decoded data sets.

9. The method as claimed in claim 8, further comprising executing the test program by the processor unit to store at least one of image data and speech data in the memory unit as the input data on a real-time basis as said at least one of image data and speech data is supplied from a signal source.

10. The method as claimed in claim 8, wherein the plurality of encoding processes are performed in parallel as a plurality of multi-process-OS processes, and the plurality of decoding processes are performed in parallel as a plurality of multi-process-OS processes.

11. The method as claimed in claim 8, further comprising executing the test program by the processor unit to display results of the quality evaluation on a display device.

12. The method as claimed in claim 8, further comprising executing the test program by the processor unit to generate data randomly and to store the randomly generated data in the memory unit as the input data.

* * * * *